(12) United States Patent
Bernstein (10) Patent No.: US 7,154,511 B2
(45) Date of Patent: Dec. 26, 2006

(54) FAST RENDERING OF INK

(75) Inventor: Michael S. Bernstein, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 10/692,069

(22) Filed: Oct. 24, 2003

(65) Prior Publication Data

US 2005/0088464 A1  Apr. 28, 2005

(51) Int. Cl.
*G06K 9/00* (2006.01)
*G09G 5/00* (2006.01)
*B41J 29/38* (2006.01)
*G06K 9/18* (2006.01)
*G09G 1/00* (2006.01)
*B41J 2/175* (2006.01)

(52) U.S. Cl. .................. 345/619; 345/630; 345/182; 345/557; 347/100; 347/111; 382/181; 382/188

(58) Field of Classification Search ............. 345/173, 345/593, 589, 592, 156, 162, 179–183, 557, 345/619, 581, 629–630; 178/18.01; 715/700; 382/181, 219, 186–189, 213–214, 283; 347/1, 347/5–6, 100, 111

See application file for complete search history.

(56) References Cited

U.S. PATENT DOCUMENTS

| | | | |
|---|---|---|---|
| 5,557,301 A * | 9/1996 | D'Aviau de Piolant | 345/179 |
| 5,969,711 A * | 10/1999 | Menzel | 345/179 |
| 6,201,549 B1 | 3/2001 | Bronskill | |
| 6,487,570 B1 | 11/2002 | Forcier | |
| 6,493,736 B1 | 12/2002 | Forcier | |
| 6,499,043 B1 | 12/2002 | Forcier | |
| 6,502,114 B1 | 12/2002 | Forcier | |
| 6,518,960 B1 * | 2/2003 | Omura et al. | 345/177 |
| 6,552,719 B1 | 4/2003 | Lui et al. | |
| 6,704,024 B1 * | 3/2004 | Robotham et al. | 345/581 |
| 6,867,786 B1 * | 3/2005 | Lui et al. | 345/619 |
| 6,903,751 B1 * | 6/2005 | Saund et al. | 345/619 |
| 6,927,778 B1 * | 8/2005 | Aleksic et al. | 345/592 |
| 2002/0163510 A1 | 11/2002 | Williams et al. | |
| 2003/0025713 A1 | 2/2003 | Wang et al. | |
| 2003/0101163 A1 | 5/2003 | Lui et al. | |
| 2003/0137522 A1 * | 7/2003 | Kaasila et al. | 345/619 |
| 2003/0163525 A1 | 8/2003 | Hendriks et al. | |
| 2004/0252888 A1 * | 12/2004 | Bargeron et al. | 382/188 |
| 2005/0111014 A1 * | 5/2005 | Lui et al. | 358/1.1 |

OTHER PUBLICATIONS

David Bargeron et al., "Reflowing Digital Ink Annotations", ACM, vol. No. 5, Issue No. 1, pp. 385-392, Apr. 5-10, 2003.
Jason I. Hong et al., "SATIN: A Toolkit for Informal Ink-based Applications", CHI Letters vol. 2, 2, pp. 63-72, 2000.
Adam Lake et al., "Stylized Rendering Techniques For Scalable Real-Time 3D Animation", pp. 13-22, 2000.
Aditi Majumder et al., "Hardware Accelerated Real Time Charcoal Rendering", ACM, pp. 59-66, 2002.

(Continued)

*Primary Examiner*—Wesner Sajous
(74) *Attorney, Agent, or Firm*—Banner & Witcoff, Ltd.

(57) ABSTRACT

A system and process for quickly rendering ink is described. Rendered ink information is placed into a transparency map of an image. The image is combined with foreground and background information to produce a final image. Using this process, the painting of ink using transparency map information may be performed quickly and with less processor work than a slow rendering process.

18 Claims, 8 Drawing Sheets

OTHER PUBLICATIONS

Michael P. Salisbury et al., "Interactive Pen-and-Ink Illustration", Dept. of Computer Science and Engineering, University of Washington.

Michael P. Salisbury et al., "Orientable Textures for Image-Based Pen-and-Ink Illustration", University of Washington.

Mike Salisbury et al., "Scale-Dependent Reproduction of Pen-and-Ink Illustrations", Department of Computer Science and Engineering, University of Washington.

S.M.F. Treavett et al., "Pen-and-Ink Rendering in Volume Visualisation", Department of Computer Science, University of Wales Swansea, pp. 203-211.

Georges Winkenbach et al., "Computer-Generated Pen-and-Ink Illustration", Department of Computer Science and Engineering, University of Washington.

Georges Winkenbach et al., "Rendering Parametric Surfaces in Pen and Ink", Department of Computer Science and Engineering, University of Washington, pp. 469-476.

* cited by examiner

Notes.bmp

Figure 7A

Cached Ink: Notes.bmp
Foreground: White
Background: Ship.bmp

FAST RENDERING OF INK

BACKGROUND OF THE INVENTION

1. Field of the Invention

Aspects of the present invention relate to information rendering. More specifically, aspects of the present invention relate to rendering electronic ink quickly.

2. Description of Related Art

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Electronic ink allows users to easily create and store handwritten notes. Handwritten notes may take a variety of forms including free form notes, maps, sketches, memorandums, to-do lists, and others. Some information relating to these notes may be displayed more often than other information. For instance, a tide of a document displayed in a title bar may always be shown despite the changing contents of document or resizing of a window displaying the document. Similarly, icons with ink titles or descriptions may also be shown on a desktop or in documents. When the desktop or document is redrawn, the ink title or description may take a while to redraw. This is because rendering digital ink is a slow process requiring significant processor power. As ink is becoming more popular, it is becoming increasingly important to be able to render ink quickly. Without the rendering speed of ink being increased, fewer developers would desire to use ink as readily as text. For instance, developers would be reluctant to use ink for filenames, ink titles for email messages, and the like if ink continued to be difficult to render.

BRIEF SUMMARY

Aspects of the present invention address one or more of the issues mentioned above, thereby providing faster rendering of ink. At least one aspect of the present invention uses a cached version of the ink to render displayable versions of the ink. In some aspects of the present invention, the cached version of the ink may be stored in a transparency map of an image and then combined with background information to produce the renderable image. The renderable image may be quickly displayed on a surface without having to re-render the ink with every change in background or other aspect. In some instances, the cached version of the ink may be stored. In other instances, the cached version of the ink may be used for a while then discarded.

These and other aspects are addressed in relation to the Figures and related description.

BRIEF DESCRIPTION OF THE DRAWINGS

Aspects of the present invention are illustrated by way of example and not limited in the accompanying Figures.

DETAILED DESCRIPTION OF THE DRAWINGS

Aspects of the present invention relate to an improved ink rendering system. Aspects of the present invention allow fast display of ink from a cached image of ink. This document is divided into sections to assist the reader. These sections include: characteristics of ink; terms; general-purpose computing environment; overview of cached ink images; image preparation; and image display.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, $\Theta$), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink), among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. The ink information may be rendered and cached.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Elements—Objects that are placed in a tree, with their placement in the tree serving as an order.

Original Bitmap—A color or black and white bit map that is created from ink information.

Foreground color—A color or colors in which ink is to be displayed.

Background—A background area over which ink will be displayed.

Cached bitmap—A cached bitmap that is produced once and reused.

It is appreciated that any image format may be used. Bitmaps are described herein. However, other image formats may be used as well including GIFs, JPEGs, PNGs, and the like.

General-Purpose Computing Environment

Figure 1:
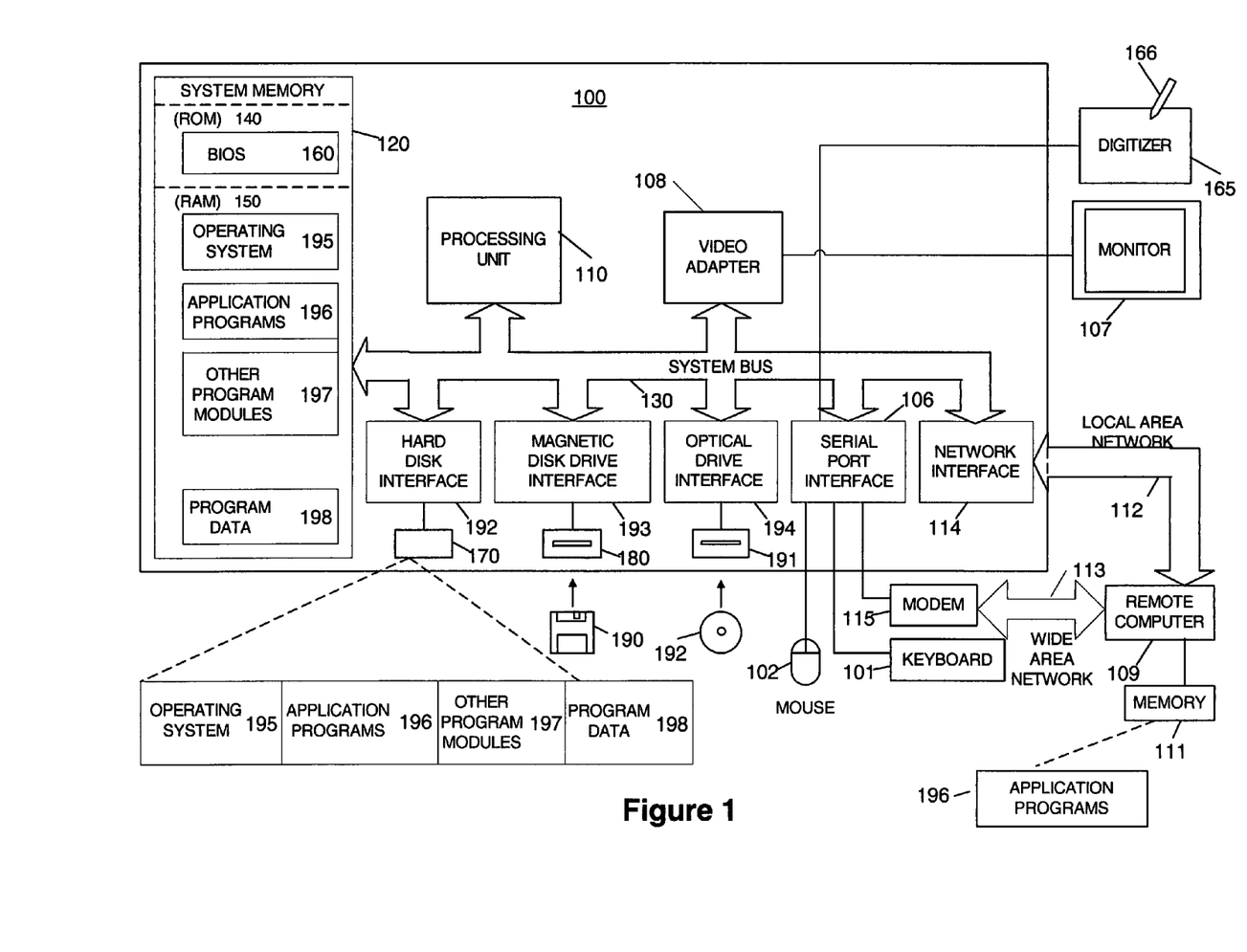
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
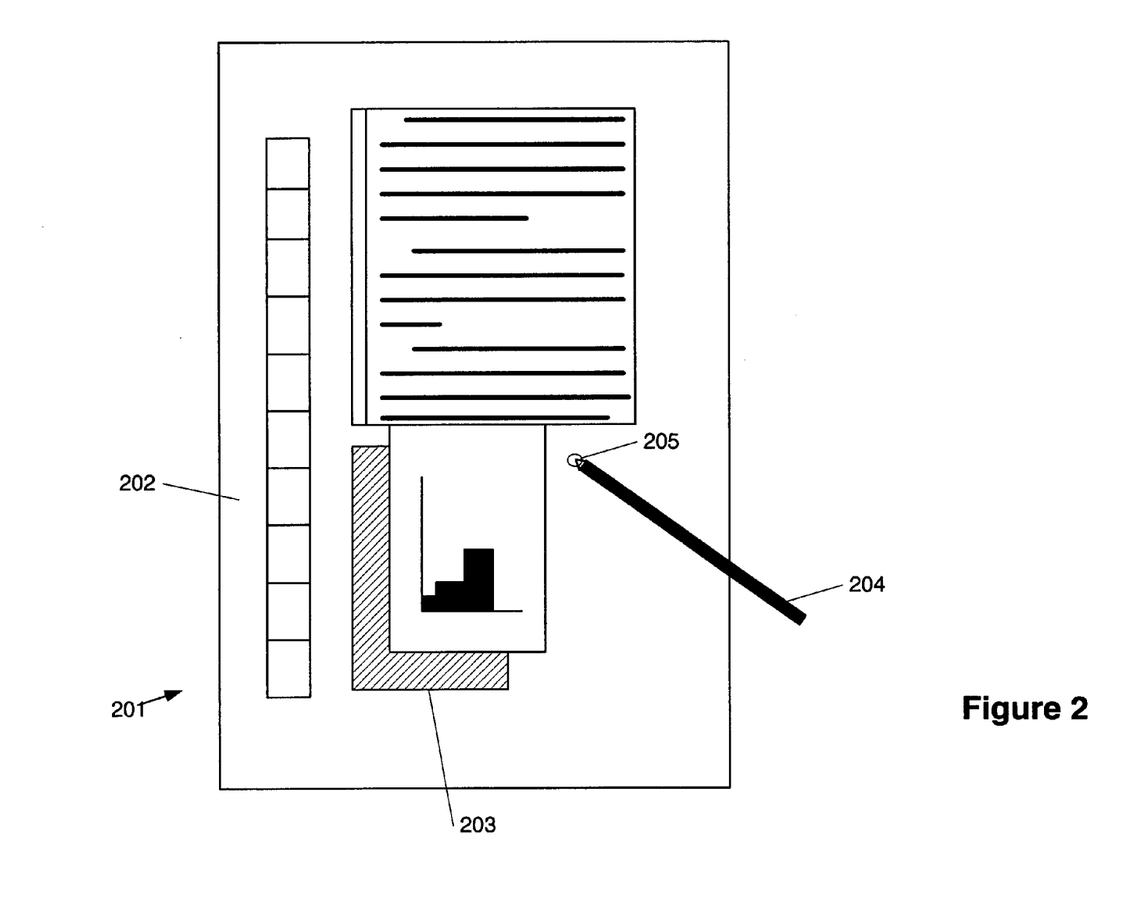
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Overview of Cached Ink Images

Repeatedly rendering ink requires processor time. The more ink on a page, the more time consumed by a processor to maintain ink on the page. For instance, if one had an ink title in a title bar of a window and one kept moving the window about the desktop, the processor would need to repeatedly render the ink title. The more ink titles on a desktop, the more processing power needed to properly render a screen.

Accordingly, to minimize the processing power used to render ink, aspects of the present invention permit storage of ink information and combining the stored ink information with a background image to permit easy display of the ink. Ink may be rendered and then processed to determine its level of transparency. Next, the level of transparency may be combined with foreground images/colors and background images/colors to produce an image that is easily handled by a computing system.

A variety of different bitmap depths may be used. For instance, one may use a 32-bit bitmap, where each pixel has four components: red (from 0 to 255), green (from 0 to 255), blue (from 0 to 255), and alpha (from 0 to 255), which is a description of transparency. An alpha of 0 may be interpreted as completely transparent, and an alpha of 255 may be interpreted as completely opaque. Alternatively, other depth bit maps may be used. For instance, the red, green, and blue components may be represented by 8 bits each while the alpha component is represented by another value (for instance, 1–7 bits). In short, the various components do not always have to include identical values. Further, other combinations as known in the art may be used including but not limited to 24-bit (8 bits for each component), 16-bit (5 bits for each component), and 8-bit with its color palette. Here, the transparency maps may be stored separately. It is appreciated that only 32-bit bitmaps have alpha channels. However, new bitmap standards may include alpha channels as well.

Image Preparation

Figure 3:
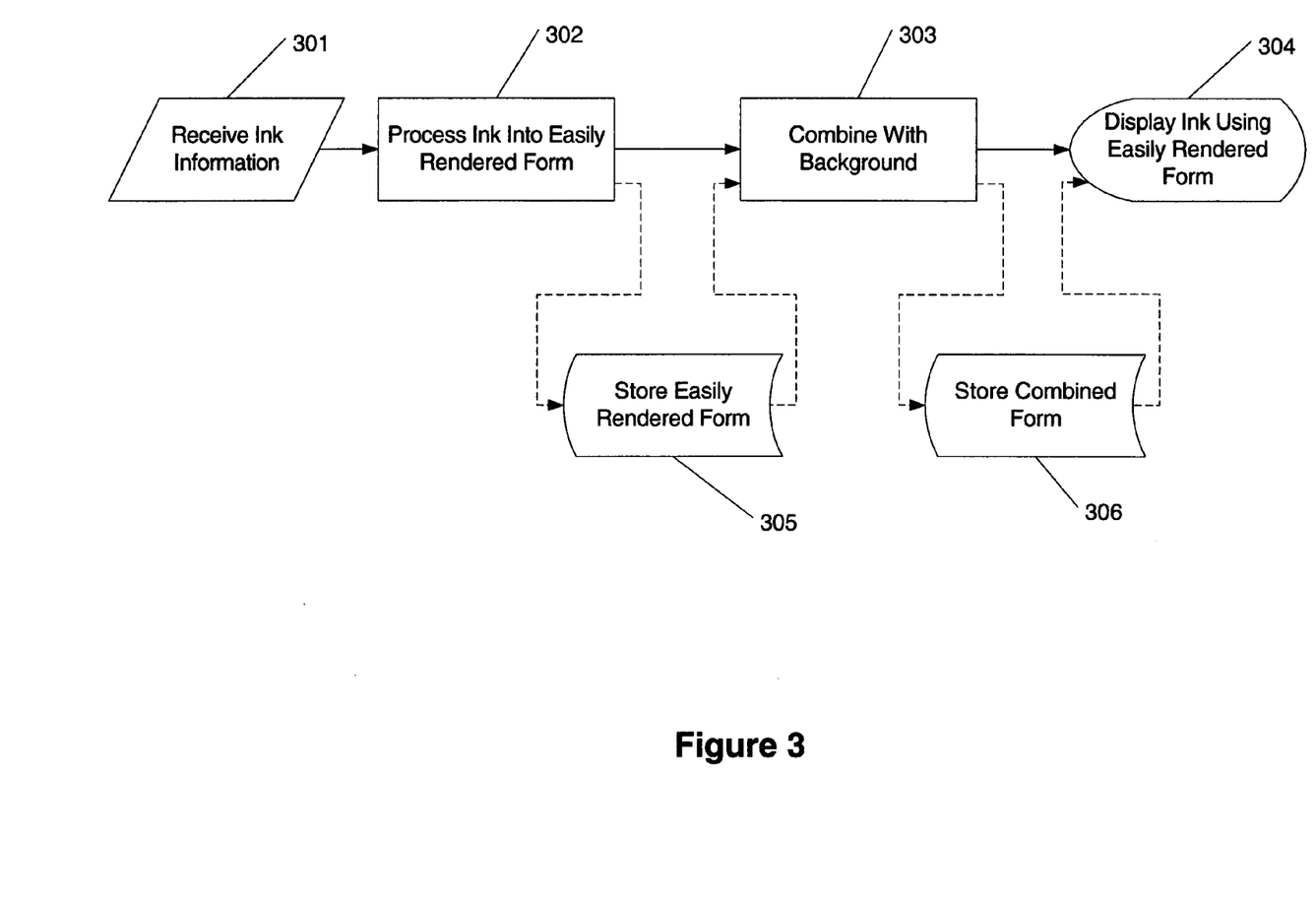
FIG. 3 shows a flow chart for creating an easily renderable form of ink in accordance with aspects of the invention.

FIG. 3 shows a process for receiving ink information and converting it into an easily reusable form. In step 301, ink information is received. In step 302, a system processes the received ink information into an easily rendered form. Next, in step 303, the easily rendered form of ink is combined with background information. Finally, in step 304, the combined information may be displayed.

The system, in one aspect, may not store information regarding the ink. Alternatively, the system may store information regarding the ink in various forms in the process. For instance, after step 302, the system may store in step 305 the easily rendered form for later use. Also, in some aspects, the system may store the output of the combined information from step 303 in step 306. These storage steps 305 and 306 may be used alone or in combination.

Figure 4:
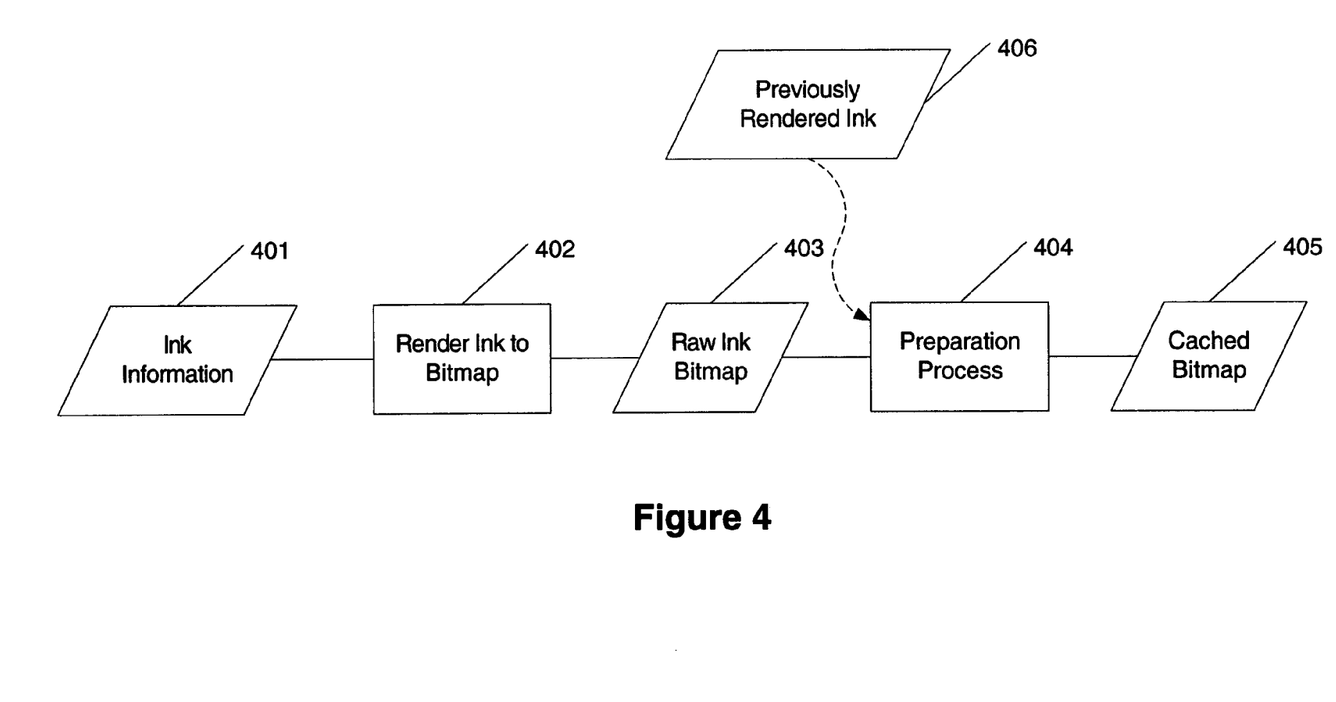
FIG. 4 shows a flow chart for processing ink in accordance with aspects of the present invention.

FIG. 4 shows a process for preparing ink information so as to make it easily renderable downstream. In step 401, ink information is received. In step 402, the ink is rendered to an image, for example, a bitmap. The bitmap may take a variety of forms. For instance, the bitmap may be a white bitmap with ink represented as black. Alternatively the ink may be white and the non-ink information be represented as black. The rendered (or raw ink) bitmap 403 is created from the rendering step 402. The rendered bitmap 403 may be a pure black and white bitmap. Alternatively, it may include shading around the rendered ink. The shading may arise from anti-aliasing operations to smooth the rendered ink.

Next in step 404, the system processes each pixel in the rendered bitmap 403. The processing includes determining the gray level of each pixel and placing this information in the alpha component of the pixel. For instance, the gray level may be represented as a number between 0 and 255, where 0 is black and 255 is white. This gray level may be subtracted from 255 and the resulting information placed in the alpha component of the pixel.

It is appreciated that alternative level of gray may be as are known in the art. One may use well known techniques to convert a pixel of a given color to an equivalent gray pixel. For example, these processes are used in converting a color picture to a gray-scale picture. The gray level of a pixel is the output of such well known techniques. Further, for instance, one may use 8 bit gray levels (256 values), 1 bit gray levels (2 values), 2 bit gray levels (4 values), 3 bit gray levels (8 values), and the like. The transparency map may be determined from this information. The remaining portion of the pixel may or may not be overwritten or cleared. In an example of leaving the information intact, one may revert to the original color of the ink if desired and render it using that original color (or colors). In various image types, the transparency map may be represented in different ways. For instance, with bitmaps, one may use an alpha channel of a pixel to store information regarding transparency of the pixel. The resulting bitmap or other image may be stored in step 405. Further, the system may optionally receive previously rendered ink 406, process it in step 404, and output it in step 406.

It is further appreciated that the lightness or darkness (or saturation) of the alpha value of the pixel may be further modified up or down, depending on the desired saturation level. In an alternative aspect, for instance, if the gray level of an ink bitmap does not use the full range of possible values of the saturation values, the actual values may be scaled to use the entire range. For example, one may use the following equation to use the entire range of alpha channel values.

$$\text{Alpha channel} = \text{Max value} - (\text{actual value} * C)$$

Where Alpha channel is the alpha channel of the pixel, Max value is the maximum range of values, actual value is the gray level of each pixel of the rendered bitmap 403, and C is an adjustment factor that may be used to insured the entire range of the alpha channel is used. If the range of actual values used in a bitmap is between 0 and 200, while the Max value is 255, C may be set to 1.27 (=256/201). Further, an offset may need to be applied if the actual values do not start at 0. This offset is represented as D. this changes the alpha channel equation as follows:

$$\text{Alpha channel} = \text{Max value} - (\text{actual value} * C) + D$$

Image Display

Figure 5:
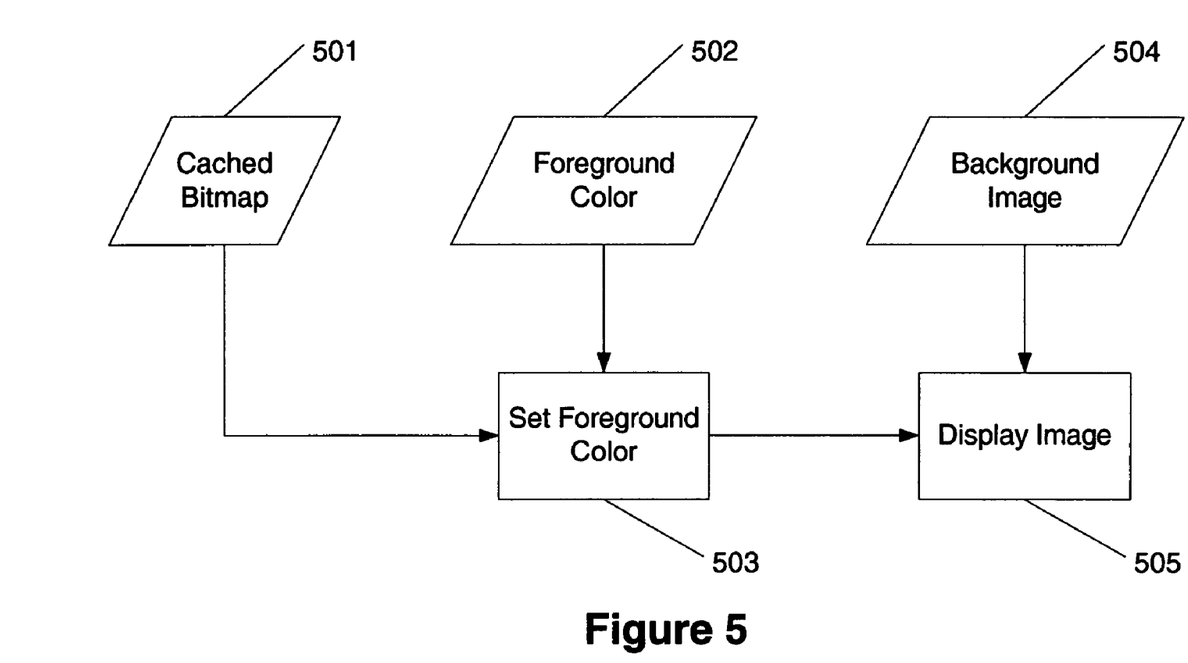
FIG. 5 shows a process for using a cached bit map in combination one or more images to create a final image in accordance with aspects of the present invention.

FIG. 5 shows a process for displaying ink using the cached bitmap. Cached bitmap 501 is combined with foreground color 502 at the set foreground color step 503. The foreground color 502 is the color in which the ink is to be displayed. Each pixel from the cached bitmap 501 is processed. The red, green, and blue components of the cached bitmap 501 are set to the corresponding red, green, and blue components of the foreground color 502. The combination of the alpha channel information with the foreground layer information 502 provides ink to be displayed in the foreground color with the level of transparency set in the alpha channel.

Next in step 505 of the resulting bitmap is drawn on a screen in combination with the background image 504. The black areas in the raw or rendered bit map 403 now have the color of the foreground color 502. The white areas in the raw or rendered bit map 403 now have the background color from background 504.

Foreground color 502 and background color 504 may include images in place of or in conjunction with single colors. Accordingly, when the foreground color 502 includes an image, the displayed image 505 may show the ink with the coloration of the image from the foreground color (now image or images) 502.

The background image 504 is shown where the alpha channel of the cached bitmap 501 was white. Where the alpha channel of the cached bitmap 501 was not white or black, a blending proportional to the alpha channel may be performed blending the foreground color or image 502 with the background color or image 504. The blending may be linear or non-linear. For instance, a developer may desire to have more foreground information in the blending image for various degrees of transparency. Alternatively, the developer may desire to have more background information for the same degrees of transparency. This may be accomplished by a variety of techniques including modifying the alpha channel based on a predefined correction table or an equation that shifts the alpha channel to adjust the transparency. Adjusting the transparency level may improve the appearance of ink.

Aspects of the present invention may be applied in a number of environments including ink file names, ink titles of documents, ink pictures, and the like.

Various technologies may be used to create the bitmaps described. For instance, an ink rendering engine may be used to initially render the ink. Next a graphics engine as is known in the art may be used to draw the cached bitmap. The foreground color/image 502 and the background color/image 504 may be derived from existing information on a computer system or may be drawn from other sources as is known in the art.

Figure 6:
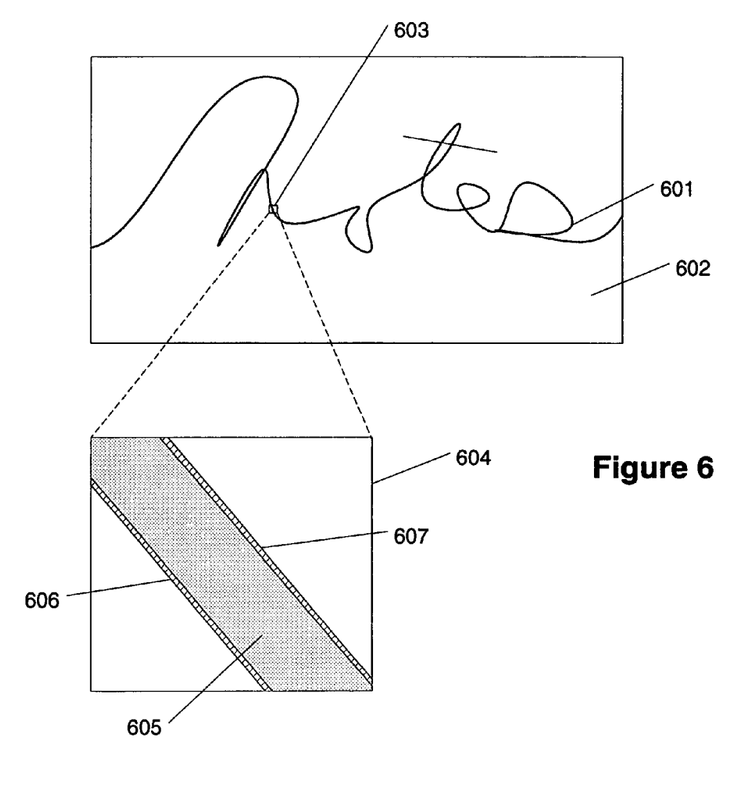
FIG. 6 shows an example of how ink is converted to an easily renderable form in accordance with aspects of the present invention.

FIG. 6 shows an example of a cached bitmap. Rendered ink has been converted to alpha channel information. Black information is shown as information 601 (comprising the ink word "notes") and white (or transparent) is shown as information 602. Area 603 is enlarged to show anti-aliasing as region 604. Here, region 604 includes a portion 605 of information 601. On the sides of portion 605 are regions 606 and 607 showing anti-aliased side bands to reduce the aliasing of the ink information 601. Anti-aliasing may be turned off or on, dependent on a user's or developer's preference.

Figures 7A, 7B:
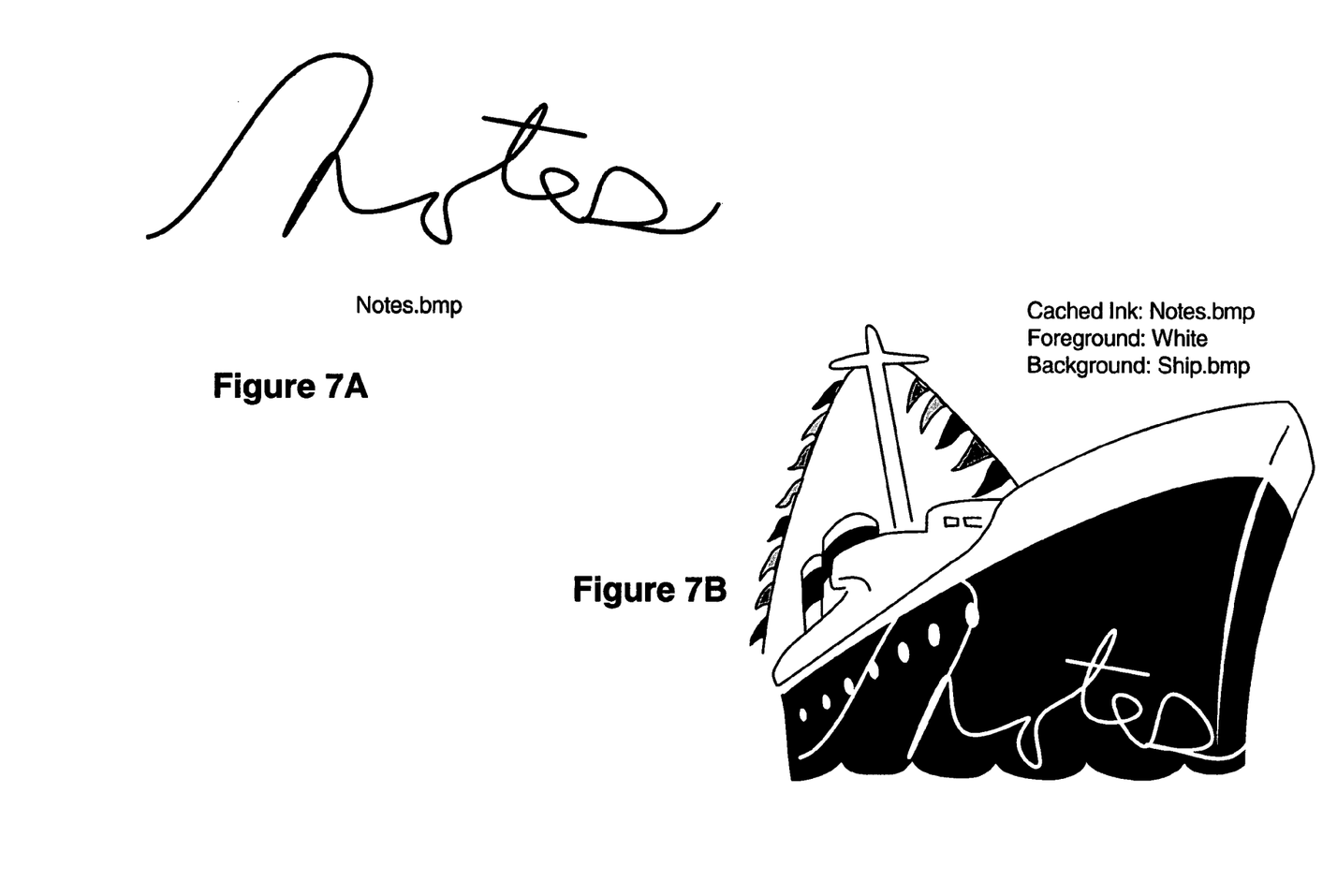
FIGS. 7A and 7B illustrate images displayed in accordance with one or more aspects described herein.

FIGS. 7A and 7B show various displayed images in accordance with aspects of the present invention. FIG. 7A shows a rendered bitmap with ink information in the alpha channel of the image. The title of the bitmap is "notes.bmp". FIG. 7B shows the combination of bitmap from 7A having been combined with a background image and a foreground color. Here, the alpha channel is notes.bmp, the foreground color is white, and the background color/image is "ship.bmp" (showing an image of a ship). The combined image is the ship of ship.bmp with ink shown in white.

Figure 8:
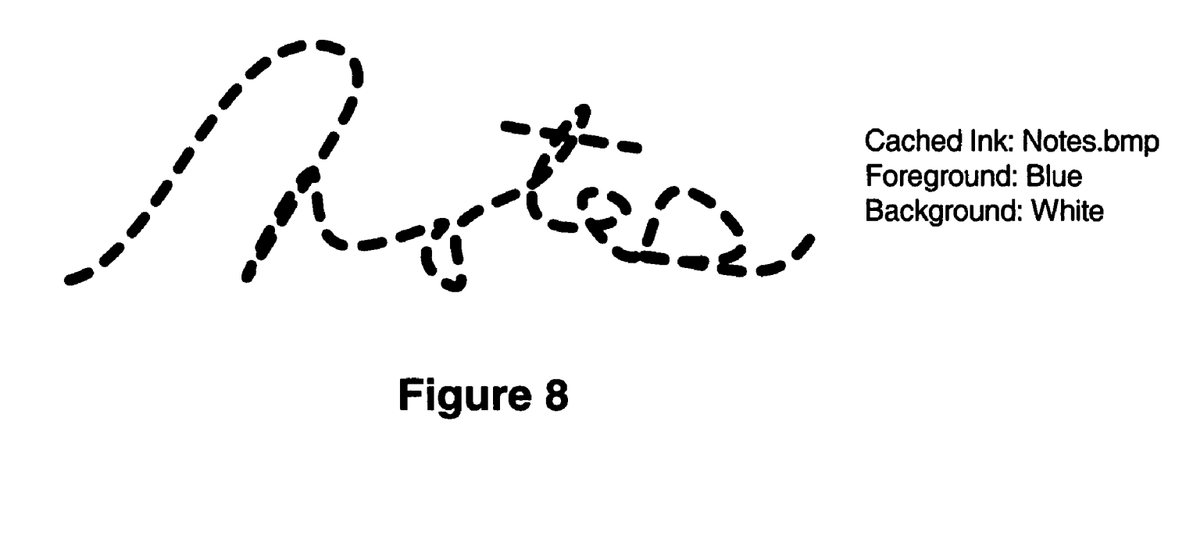
FIG. 8 illustrates a combination of information of an ink notes file, a foreground and a background according to one or more aspects described herein.

FIG. 8 shows a combination of information of the ink notes.bmp, a blue foreground color and a white background. In this example, the original color of the ink may be eliminated from the determination of the displayed combination of ink and the other images/colors.

Aspects of the invention may be applied outside of the ink arena. For instance, aspects of the present invention may be applied to any operation where it takes a long time to create the foreground of an image and where one would like to reuse that foreground over other backgrounds (e.g. if it took a long time to draw a window title, one might want to cache the window title and re-use it whenever the window changed position or when the window title background changed color).

Aspects of the present invention have been described in terms of illustrative embodiments thereof. Numerous other embodiments, modifications and variations within the scope and spirit of the appended claims will occur to persons of ordinary skill in the art from a review of this disclosure.

I claim:

1. A process for caching ink information comprising the steps of:
   receiving ink input from a user;
   rendering said ink;
   creating a transparency map, wherein the transparency map stores transparency information corresponding to said ink; and,
   caching said transparency map, wherein the transparency map is later combined with foreground information to define one or more attributes of a likeness of the rendered ink and produce a resultant image that includes the likeness of said ink.

2. The process according to claim 1, further comprising the steps of: storing said transparency map.

3. The process according to claim 1, wherein said rendering step produces a bitmap of said ink.

4. The process according to claim 1, wherein said transparency map is an alpha channel of an image.

5. The process according to claim 4, wherein said image is a bitmap image.

6. A system for caching ink information comprising:
   means for receiving ink input from a user;
   means for rendering ink;
   means for creating a transparency map, wherein the transparency map stores only transparency information, wherein at least a portion of the transparency information corresponds to said ink, and wherein the transparency map is later combined with foreground information to define one or more attributes of a likeness of the rendered ink and produce a resultant image including the likeness of said ink; and,
   means for caching said transparency map.

7. The system according to claim 6, further comprising: means for storing said transparency map.

8. The system according to claim 6, wherein said means for rendering produces a bitmap of said ink.

9. The system according to claim 6, wherein said transparency map is an alpha channel of an image.

10. The system according to claim 9, wherein said image is a bitmap image.

11. A process for displaying ink information comprising the steps of:
    creating a transparency map, wherein the transparency map stores transparency information corresponding to ink input from a user;
    applying foreground information to said transparency map to define one or more attributes of a likeness of said ink;
    combining the transparency map defined by said foreground information with background information to form a resultant image; and,
    displaying said resultant image.

12. The process according to claim 11, wherein said transparency information is in an alpha channel of an image.

13. The process according to claim 12, wherein said image is a bitmap image.

14. A system for displaying ink information comprising:
    means for creating a transparency map, wherein the transparency map stores transparency information relating to ink input from a user;
    means for applying foreground information to said transparency map to define one or more attributes of a likeness of said ink;
    means for combining the transparency map defined by said foreground information with background information to form a resultant image; and,
    means for displaying said resultant image.

15. The system according to claim 14, wherein said transparency information is in an alpha channel of an image.

16. The system according to claim 15, wherein said image is a bitmap image.

17. The process of claim 11, wherein the one or more attributes includes a color of said ink.

18. The system of claim 14, wherein the one or more attributes includes a color of said ink.

* * * * *